(12) United States Patent
Brathwaite et al.

(10) Patent No.: US 8,806,398 B2
(45) Date of Patent: Aug. 12, 2014

(54) SYSTEM AND METHOD FOR DESIGN, PROCUREMENT AND MANUFACTURING COLLABORATION

(75) Inventors: Nicholas E. Brathwaite, Hayward, CA (US); Ram Gopal Bommakanti, Fremont, CA (US); Visvanathan Ganapathy, Santa Clara, CA (US); Paul N. Burns, San Jose, CA (US); Douglas Edward Maddox, Santa Cruz, CA (US); Michael Anthony Durkan, Carrigaline (IE)

(73) Assignee: Flextronics AP, LLC, San Jose, CA (US)

( * ) Notice: Subject to any disclaimer, the term of this patent is extended or adjusted under 35 U.S.C. 154(b) by 292 days.

(21) Appl. No.: 12/799,534

(22) Filed: Apr. 27, 2010

(65) Prior Publication Data
US 2010/0242005 A1  Sep. 23, 2010

Related U.S. Application Data

(62) Division of application No. 11/585,370, filed on Oct. 24, 2006, now Pat. No. 7,712,058, which is a division of application No. 10/372,022, filed on Feb. 21, 2003, now Pat. No. 7,134,096.

(60) Provisional application No. 60/359,424, filed on Feb. 22, 2002.

(51) Int. Cl.
*G06F 17/50* (2006.01)
*G06Q 99/00* (2006.01)

(52) U.S. Cl.
CPC ............ *G06F 17/5045* (2013.01); *G06Q 99/00* (2013.01); *G06F 17/5081* (2013.01)
USPC ............................ 716/102; 716/132; 716/136

(58) Field of Classification Search
None
See application file for complete search history.

(56) References Cited

U.S. PATENT DOCUMENTS

| 5,050,091 A | 9/1991 | Rubin |
| 5,109,337 A * | 4/1992 | Ferriter et al. .................. 705/29 |

(Continued)

FOREIGN PATENT DOCUMENTS

| JP | 2000-285123 | 10/2000 |
| WO | WO 01/65422 | 9/2001 |
| WO | WO 01/65423 | 9/2001 |

OTHER PUBLICATIONS

U.S. Appl. No. 13/843,730, filed Mar. 15, 2013, Brathwaite et al.

(Continued)

*Primary Examiner* — Leigh Garbowski
(74) *Attorney, Agent, or Firm* — Sheridan Ross P.C.

(57) ABSTRACT

A method for designing an electronic component includes receiving a device criteria (e.g., a parametric value, procurement value, etc.) from a designer, querying a database for devices corresponding to the device criteria, querying the database for procurement data and/or engineering data associated with the corresponding devices, presenting the devices to the designer based on the procurement data, and receiving input from the designer identifying one of the presented devices as a selected device. In a particular method, the returned devices are sorted based on one or more procurement values (e.g., manufacturer, price, availability, manufacturer status, etc.), and presented to the designer in a ranked list. Objects representative of the selected devices are then entered into a design file, and the objects are associated with the device's engineering and/or procurement data. In a particular embodiment, the objects are associated with the engineering data by embedding the engineering data in the file object. Optionally, data can be associated with the objects via links to the database. Types of engineering data that can be associated with design file objects include, but are not limited to, device footprint data, device pinout data, device physical dimension data, parametric data, and packaging data. Additionally, connection data and annotation data can be entered into the design file objects by the designer.

24 Claims, 9 Drawing Sheets

(56) References Cited

U.S. PATENT DOCUMENTS

| | | | |
|---|---|---|---|
| 5,111,413 A | | 5/1992 | Lazansky et al. |
| 5,475,804 A | * | 12/1995 | Bennett .................... 345/668 |
| 5,539,652 A | * | 7/1996 | Tegethoff .................... 703/14 |
| 5,544,067 A | | 8/1996 | Rostoker et al. |
| 5,553,002 A | | 9/1996 | Dangelo et al. |
| 5,579,231 A | * | 11/1996 | Sudou et al. .................... 700/95 |
| 5,608,638 A | * | 3/1997 | Tain et al. .................... 700/121 |
| 5,673,198 A | | 9/1997 | Lawman et al. |
| 5,757,655 A | | 5/1998 | Shih et al. |
| 5,787,006 A | | 7/1998 | Chevallier et al. |
| 5,822,206 A | | 10/1998 | Sebastian et al. |
| 5,970,465 A | * | 10/1999 | Dietrich et al. .............. 705/7.22 |
| 6,009,406 A | | 12/1999 | Nick |
| 6,023,565 A | | 2/2000 | Lawman et al. |
| 6,108,662 A | * | 8/2000 | Hoskins et al. ................. 700/95 |
| 6,110,213 A | * | 8/2000 | Vinciarelli et al. ............... 703/1 |
| 6,115,546 A | | 9/2000 | Chevallier et al. |
| 6,115,547 A | * | 9/2000 | Ghatate et al. .................. 703/13 |
| 6,118,938 A | | 9/2000 | Lawman et al. |
| 6,167,383 A | | 12/2000 | Henson |
| 6,177,942 B1 | * | 1/2001 | Keong et al. .................. 715/810 |
| 6,230,066 B1 | | 5/2001 | Sferro et al. |
| 6,230,305 B1 | | 5/2001 | Meares |
| 6,243,848 B1 | * | 6/2001 | Guignet et al. ............... 716/104 |
| 6,249,714 B1 | * | 6/2001 | Hocaoglu et al. .............. 700/97 |
| 6,295,513 B1 | * | 9/2001 | Thackston ....................... 703/1 |
| 6,470,482 B1 | | 10/2002 | Rostoker et al. |
| 6,496,957 B1 | * | 12/2002 | Kumagai ...................... 716/112 |
| 6,578,174 B2 | * | 6/2003 | Zizzo ............................ 716/103 |
| 6,594,799 B1 | * | 7/2003 | Robertson et al. ............ 716/100 |
| 6,847,853 B1 | * | 1/2005 | Vinciarelli et al. ............. 700/97 |
| 6,850,900 B1 | * | 2/2005 | Hare et al. ....................... 705/80 |
| 6,851,094 B1 | * | 2/2005 | Robertson et al. ............ 716/129 |
| 6,898,580 B1 | * | 5/2005 | Curran et al. ................. 705/400 |
| 7,039,604 B1 | * | 5/2006 | Srinivasan et al. ........... 705/26.5 |
| 7,134,096 B2 | | 11/2006 | Brathwaite et al. |
| 7,299,202 B2 | * | 11/2007 | Swanson ...................... 705/26.5 |
| 7,386,811 B2 | * | 6/2008 | Kitagawa et al. ............. 716/100 |
| 7,613,599 B2 | * | 11/2009 | Bade et al. ....................... 703/14 |
| 7,712,058 B2 | | 5/2010 | Brathwaite et al. |
| 7,870,033 B2 | * | 1/2011 | Swanson ...................... 705/26.1 |
| 7,899,896 B2 | * | 3/2011 | Kitagawa et al. ............. 709/223 |
| 7,970,596 B2 | * | 6/2011 | Bade et al. ....................... 703/13 |
| 8,200,552 B2 | * | 6/2012 | Swanson ...................... 705/27.1 |

OTHER PUBLICATIONS

Kojima et al., "Packaging Design Concept Simulator for Electronic Circuit," Syst. Comp. Japn., 2000, vol. 31 (1), pp. 59-69 (Abstract) 1 page.
International Search Report for International (PCT) Patent Application No. PCT/US03/05280, dated Mar. 1, 2004 3 pages.
International Preliminary Examination Report for International (PCT) Patent Application No. PCT/US03/05280, dated Apr. 1, 2004.
Official Action for Canada Patent Application No. 2,476,871 dated Apr. 11, 2011 7 pages.
Official Action for Canada Patent Application No. 2,476,871, dated Mar. 6, 2012 2 pages.
Official Action for Canada Patent Application No. 2,723,069, dated Mar. 25, 2013 3 pages.
Official Action with English translation of China Patent Application No. 200910007518.7, dated Nov. 15, 2011 10 pages.
Supplementary Search Report for European Patent Application No. 03713592.8, dated May 19, 2010 5 pages.
Official Action for European Patent Application No. 03713592.8, dated Mar. 9, 2011 6 pages.
Official Action for India Patent Application No. 2378/DELNP/2004, dated Mar. 6, 2012 2 pages.
English Translation of Official Action for Japan Patent Application No. 2003-572070, dated May 10, 2011 2 pages.
Official Action for U.S. Appl. No. 10/372,022, mailed May 25, 2005 4 pages Restriction Requirement.
Official Action for U.S. Appl. No. 10/372,022, mailed Sep. 6, 2005 8 pages.
Official Action for U.S. Appl. No. 10/372,022, mailed Mar. 24, 2006 8 pages.
Notice of Allowance for U.S. Appl. No. 10/372,022, mailed Jul. 3, 2006 5 pages.
Official Action for U.S. Appl. No. 11/585,370, mailed Mar. 19, 2009 16 pages.
Notice of Allowance for U.S. Appl. No. 11/585,370, mailed Dec. 17, 2009 5 pages.
European Search Report for International Patent Application No. 13159973.0, dated May 3, 2013 25 pages.
Herniter, "PC Board Design and Fabrication using Schematics, PADS-PERFORM, and a Laser Printer," 1994 Frontiers I Education Conference, IEEE, Nov. 2, 1994, pp. 111-115.
Official Action for Canada Patent Application No. 2,476,871, dated May 16, 2013 3 pages.
Official Action for Canada Patent Application No. 2,723,329, dated May 16, 2013 3 pages.
Official Action for European Patent Application No. 03713592.8, dated Jul. 18, 2013 6 pages.
European Search Report for European Patent Application No. 13159973.0, dated May 3, 2013, 7 pages.
Official Action for U.S. Appl. No. 13/843,730, mailed Jun. 12, 2013, 10 pages.
Final Action for U.S. Appl. No. 13/843,730, mailed Dec. 6, 2013, 10 pages.
Official Action with English translation of China Patent Application No. 200910007518.7, dated Aug. 2, 2013 10 pages.

* cited by examiner

SYSTEM AND METHOD FOR DESIGN, PROCUREMENT AND MANUFACTURING COLLABORATION

RELATED APPLICATIONS

This application is a divisional of U.S. application Ser. No. 11/585,370, filed Oct. 24, 2006 now U.S. Pat. No. 7,712,058 by the same inventors, which is a divisional of U.S. application Ser. No. 10/372,022, filed Feb. 21, 2003 by the same inventors and now issued as U.S. Pat. No. 7,134,096, which claims the benefit of U.S. Provisional Patent Application Ser. No. 60/359,424, filed on Feb. 22, 2002 by at least one common inventor, all of which are incorporated herein by reference in their entirety.

BACKGROUND OF THE INVENTION

1. Field of the Invention

This invention relates generally to the design and manufacture of electronic components, and more particularly to a schematic design tool capable of integrating design and procurement analysis at the design stage of a component.

2. Description of the Background Art

Computer Aided Design (CAD) systems are well known and widely used in the design of electronic circuits. Known systems allow the designer to enter objects into an electronic drawing file and to connect the objects in order to "draw" the circuit being designed.

While some CAD systems appear quite complex, and offer the designer a great variety of drawing tools, such programs are essentially only drawing engines. The objects in the drawing files are only arcs, circles, lines, etc. While the arcs, circles, and lines can be grouped to provide the appearance of an object (e.g., a transistor symbol, a device package, text labels, etc.), the object is still only a group of arcs, circles, lines, etc. The CAD program does not recognize the object as an entity having any real physical characteristics (e.g., device type, function, etc.).

FIG. 1 illustrates the conventional process of bringing an electronic component from conception to manufacturing. In an initial concept stage 102 the gross structure, purpose, function, etc. of the electronic component is conceived. Then, in a schematic design stage 104, the designer reduces the concept to a schematic drawing. As described above, the schematic drawing is simply a picture of a circuit, with symbols representing the various electronic devices (resistors, transistors, capacitors, etc.). Then, in a third step 106, the schematic drawing is sent to a printed circuit board (PCB) designer, where one or more PCBs are designed for the electronic component. PCB design stage 106 is very time consuming, requiring that the designer identify each device in the drawing, assemble the engineering data (device type, value, packaging, footprint, etc.) for each device, identify the interconnectivity of the devices in the drawing, and then layout the PCB. Next, in a fourth step 108, the PCB is fabricated.

In a fifth stage 110, a copy of the schematic drawing is also transferred to a Product Introduction Center (PIC), where the electronic devices necessary to build the electronic component are purchased. In order to reduce the time to market for the component, PCB design stage 106 and PIC buy stage 110 typically occur simultaneously. In some cases, it is necessary for the PIC to select and/or substitute for electronic devices in the design. The result is that the design being used by the PCB fab might vary slightly from the design being used by the PIC.

Next, in a sixth stage 112, a prototype is assembled, and the design undergoes DFx analysis (e.g., design for manufacturability, design for testability, design for fabrication, design for quality, design for reliability, etc.). If the results of the DFx analysis is unsatisfactory, then the component design is returned to the design stage 104 to remedy any perceived defects. Typically, a design will go through several iterations before being acceptable for high volume manufacturing.

Once the component design is found acceptable in the prototype and DFx stage 112, the design is forwarded to a high volume facility, where in a seventh stage 114 a supply chain for the component devices is set up, and additional DFx analysis is performed. Any necessary design revisions are made, and the revised design is forwarded to a high volume procurement stage 116, where the electronic devices required for manufacturing the designed component are acquired. Finally, in a ninth stage 118, the components are manufactured.

Note that there is feed back from the high volume procurement stage 116 and the manufacturing stage 118 to the supply chain setup stage 114, in order to fine-tune the supply chain. However, note that there is no feedback from any of stages 114, 116, or 118 to the schematic design stage 104. Therefore, any design errors corrected in stage 114, will recur if new revisions of the design flow from schematic design stage 104 through to manufacturing stage 118.

In summary, the multiple redesigns in the initial design stage, and repetition of design errors resulting from a lack of feedback from manufacturing to design, all contribute to an increased time to market and increased design cost. What is needed, therefore, is a system and method for designing an electronic component that reduces the number of redesigns necessitated by procurement processes. What is also needed is a system and method that reduces the number of times a design error is introduced into the design to manufacturing flow. What is also needed is a system and method that facilitates easy annotation of design changes.

SUMMARY

The present invention overcomes the problems associated with the prior art by providing a system and method for integrating an electronic component design tool with business rules filters and design analysis processes. One aspect of the invention facilitates designing components with devices that are preferred from a procurement standpoint, thereby reducing the need for subsequent procurement based design changes. Another aspect of the invention facilitates the performance of manufacturability and/or modeling tests at the design stage, thereby reducing the need for subsequent manufacturing based design changes.

A method for designing an electronic component includes receiving a device criteria (e.g., a parametric value, procurement value, etc.) from a designer, querying a database for devices corresponding to the search criteria, querying the database for procurement data and/or engineering data associated with the corresponding devices, presenting the devices to the designer based on the procurement data, and receiving input from the designer identifying one of the presented devices as a selected device. In a particular method, the returned devices are sorted based on one or more procurement values (e.g., manufacturer, price, availability, manufacturer status, etc.), and presented to the designer in a ranked list.

Objects representative of the selected devices are then entered into a design file, and the objects are associated with the device's engineering and/or procurement data. In a particular embodiment, the objects are associated with the engineering data by embedding the engineering data in the file object. Optionally, data can be associated with the objects via links to the database. Types of engineering data that can be associated with design file objects include, but are not limited to, device footprint data, device pinout data, device physical dimension data, parametric data, and packaging data. Additionally, connection data and annotation data can be entered into the design file objects by the designer.

Associating procurement and/or engineering data with design file objects facilitates the performance of operational and manufacturability testing. In one method, design rules are retrieved and used to run tests on the design file. The type of design tests run include, but are not limited to design for manufacturability, design for testability, design for fabrication, design for quality, and design for reliability. Additionally, predictive modeling tests can be run on the design file, because the file objects are associated with parametric data. Further, design for procurement test can be run, because the file objects are associated with procurement data. The foregoing test can be run as devices are placed in the design file, or when the design is complete, depending on the nature of the particular test and the designer's preference.

Feedback can be provided from manufacturing processes to the design stage by updating the design rules. Similarly, feedback can be provided from a procurement department to the designer, by updating the procurement data in the database. Such feedback is believed to be unknown in the prior art.

In another particular method, post-design reports are generated that are useful in subsequent manufacturing processes. Examples of such reports include, but are not limited to, a net list (defines device interconnections) and a bill of materials (BOM).

Computer-readable media having code embodied therein for causing a computer to facilitate the methods of the present invention are also disclosed.

A system for designing electronic components is also described. The system includes a designer interface for receiving data and commands from a designer, and a schematic design tool. The schematic design tool is responsive to receiving device criteria (e.g., parametric data) from the designer, and operative to query a database for devices satisfying the device criteria and for procurement data associated with the devices, and to present the devices to the designer based on the procurement data. The design tool is then operative to receive input from the designer indicating that one of the displayed devices is selected, to insert an object representative of the selected device into a design file, and to associate the procurement data with the file object. Engineering data associated with the device can also be associated with the file object.

A particular embodiment further includes a bill of materials generator operative to generate a bill of materials from the procurement and/or engineering data associated with objects in the design file. Another particular embodiment includes a net list generator operative to generate a net list from the engineering data associated with objects in the design file. Another embodiment includes a design analyzer (DFx, predictive modeling, etc.) operative to perform design analysis on the design file.

Innovative data structures for storing data in parts databases are also disclosed.

Innovative data structures for associating procurement and/or engineering data with objects in a design file are also disclosed.

Innovative business methods for taking electronic components from a conception stage to and through a manufacturing process are also disclosed.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by integrating supply chain information and/or DFx analysis with a schematic design tool. In the following description, numerous specific details are set forth (e.g., particular data structures, particular types of DFx analysis, etc.) in order to provide a thorough understanding of the invention. Those skilled in the art will recognize, however, that the invention may be practiced apart from these specific details. In other instances, details of well-known computer programming practices (e.g., provision of APIs, database management, etc.) have been omitted, so as not to unnecessarily obscure the present invention.

Figure 1:
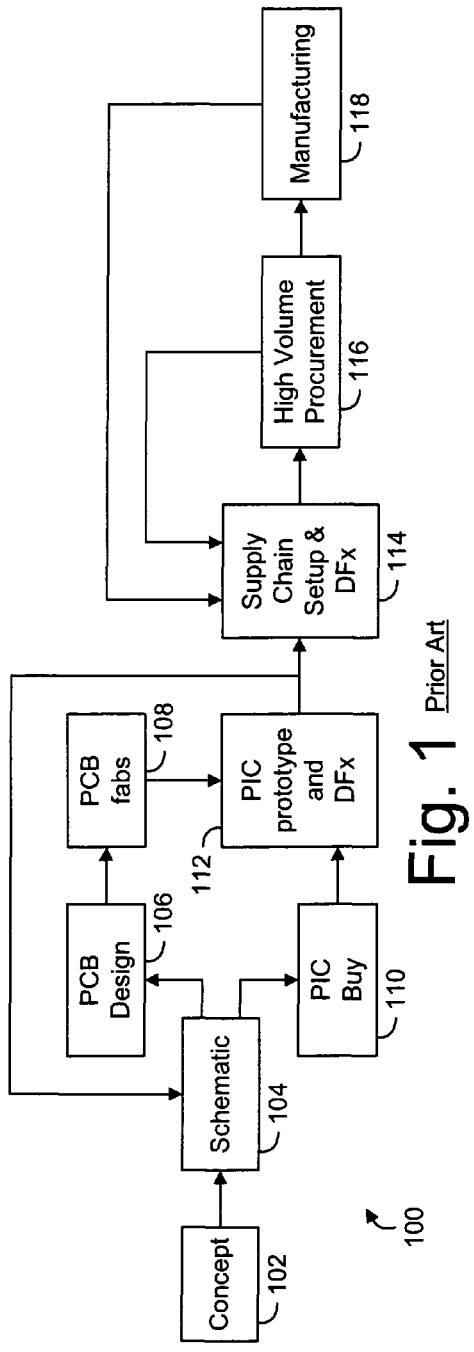
FIG. 1 illustrates a prior art process of taking an electronic component from conception to manufacturing.
Figure 2:
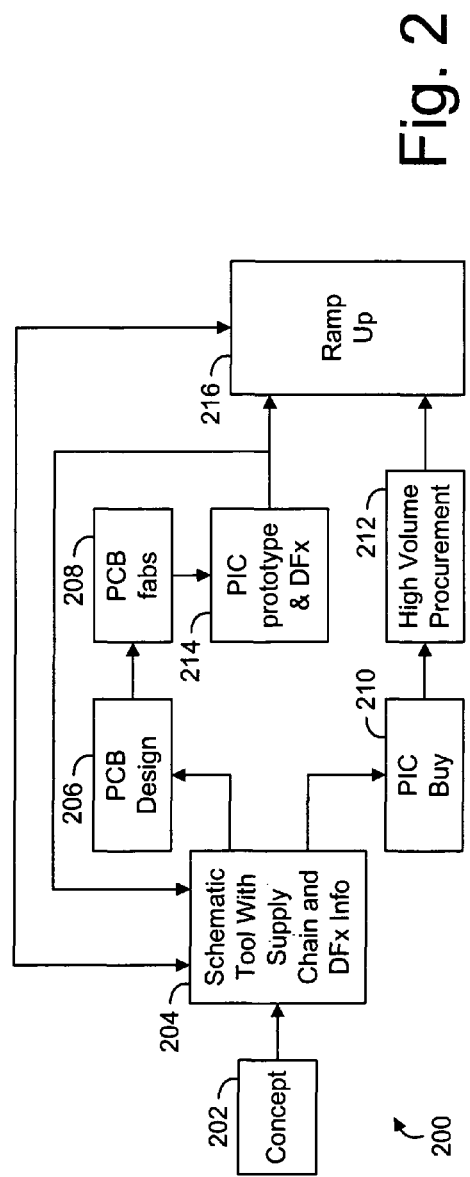
FIG. 2 illustrates a process of taking an electronic component from conception to manufacturing according to one embodiment of the present invention.

FIG. 2 illustrates a process 200 of taking an electronic component from conception to manufacture according to one aspect of the present invention. The first conception stage 202 is not unlike the conception stage 102 in the process of the prior art. In the design stage 204, however, the component is designed using a schematic design tool that accesses and uses supply chain (procurement) and/or DFx resources during the initial design stage. The function of the schematic design tool will be described in greater detail below. For the purpose of understanding process 200, it is sufficient to know that the schematic design tool selects devices based on procurement criteria, and then embeds (either directly or via links) procurement and engineering data in the design file. Selecting devices for inclusion in the design based on procurement data eliminates or at least greatly reduces the number of design changes required during later procurement processes. Embedding engineering data (e.g., device footprints, pinouts, etc.) in the design file enables the design tool to perform DFx analyses on the component at the design stage, thereby eliminating or at least greatly reducing the number of redesigns necessary to ensure the manufacturability of the design.

Embedding engineering and procurement data also simplifies subsequent stages of process 200, by enabling the schematic design tool to produce output useful in subsequent processes. For example, the design tool can automatically generate a net list (Connectivity, device types, footprints, pinouts, etc.) for use in the PCB design 206 and fabrication 208 processes. As another example, the schematic design tool can automatically generate a bill of materials (BOM) for use in the PIC buy process 210. Further, because the devices used in the component were selected based on procurement data, and the design file already includes the procurement data, no additional supply chain setup is required. Thus, method 200 can proceed directly from the PIC buy process to the high volume procurement process 212.

The PIC prototype and DFx process 214 is similar to the analogous process in the prior art, except that the number of DFx issues requiring design changes is greatly reduced. Because the high volume procurement process 212 can now be performed essentially concurrently with the PIC buy process 210, process 200 can proceed to a ramp up process 216 to ramp up to high volume manufacturing as soon as the design passes the DFx analysis in process 214.

Finally, note that there is a feedback loop (including 2-way design change annotation) between the manufacturing ramp up process 216 and the design process 204. Mechanisms of providing this feedback will be described below with reference to example embodiments of the invention.

Figure 3:
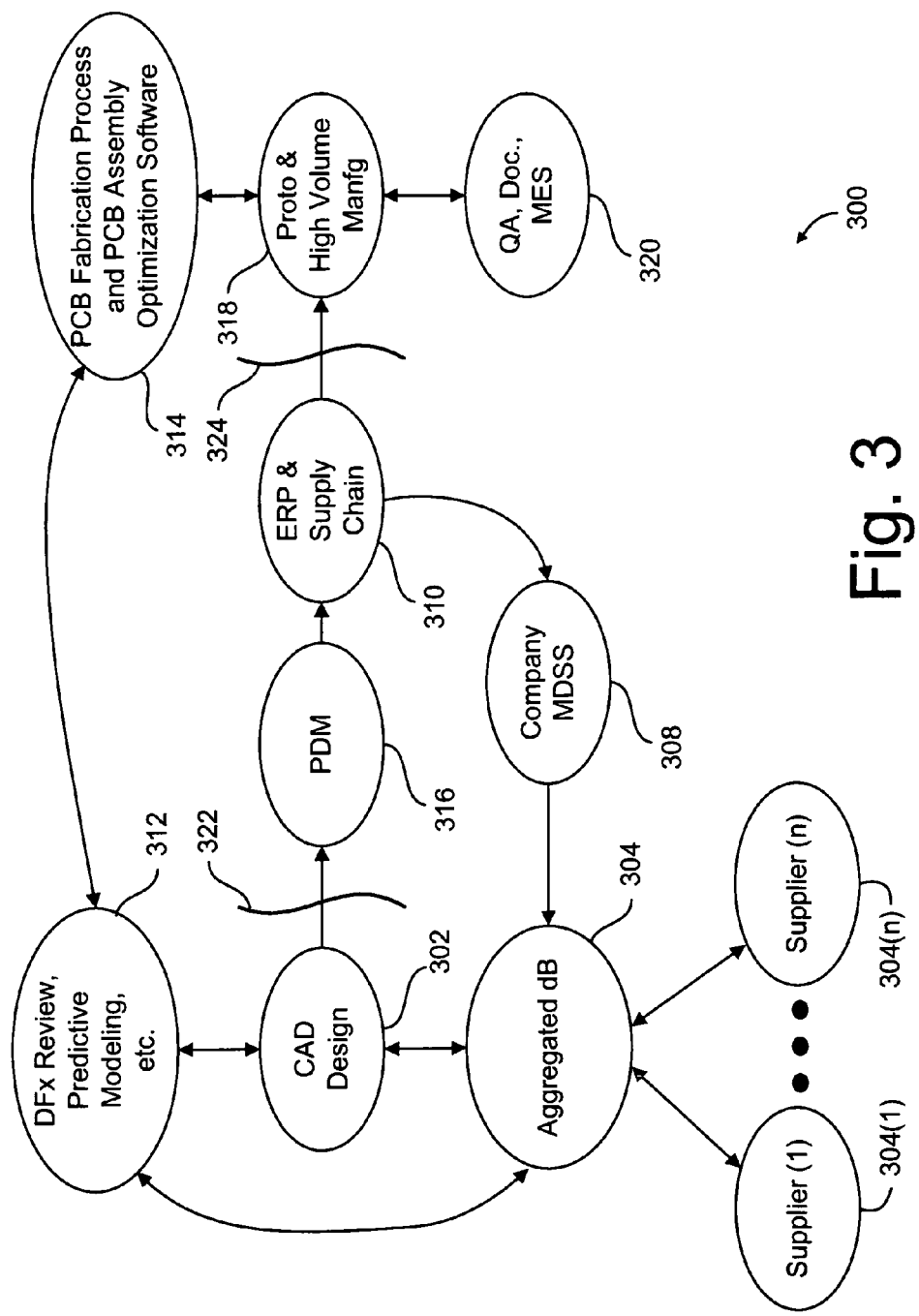
FIG. 3 is a relational diagram illustrating the integration of procurement and design analysis at the design stage of a component.

FIG. 3 is a relational diagram 300 illustrating how design analysis and procurement information are provided at the designers desktop. CAD design 302 is a schematic design tool with which a designer can design electronic components. Aggregated database 304 is a database of electronic devices that includes procurement data and engineering data associated with the electronic devices stored therein. CAD design system 302 queries database 304 for devices meeting the designer's criteria, then the devices along with the associated engineering data and procurement data are placed in component design files.

Aggregated database 304 can be updated and/or augmented in a number of ways. For example, suppliers (1-*n*) can update some of the procurement (price, availability, etc.) and/or engineering data (packaging, footprint, etc.) associated with the devices that they supply. Additionally, the company's material decision support system (MDSS) 308, based on feedback from the company's enterprise resource planning (ERP) and the supply chain 310, can update and/or augment procurement data (e.g., new manufacturers, preferred vendor status, discounts, etc.) in aggregated database 304. Further, a DFx/predictive modeling process 312 can update and/or augment engineering data in database 304, based on feedback from a PCB fabrication and assembly process 314.

In addition to providing feedback to aggregated database 304, DFx/predictive modeling process 312 can be invoked by CAD design 302 to analyze a component design file. In the present embodiment, DFx analysis is performed as each device is placed in the design file by CAD design 302. Thus, a designer would get a warning if the placement of a device in the design file violated a design rule (e.g., wrong family of devices, etc.). Optionally, DFx review/predictive modeling 312 can be invoked by a command from CAD design 312, either during or immediately after the design of the component.

DFx programs are well known to those skilled in the art. It is considered to be a novel aspect of this invention, however, to implement DFx analysis at the design stage by a schematic design program. DFx analysis and/or predictive modeling processes can be called by CAD design 302 via an application program interface (API), or optionally can be incorporated into the CAD design program 302 itself. In either case, embedding the engineering data in the design file makes DFx analysis and predictive modeling possible at the earliest design stage.

When the component design is complete, the design file (or reports generated therefrom) is passed to a product data manager (PDM) 316 for documentation and annotation of the design. The documentation and annotation of the design is accomplished, at least in part, by embedding annotation data in the design file. This facilitates 2-way change annotation should design revisions be necessary later.

ERP and supply chain process 310 receives the design file from PDM 316, and uses the design file, or reports generated therefrom (e.g., BOM), to procure the devices necessary to manufacture the component. Prototype and high volume manufacturing processes assemble the procured devices and fabricated PCBs into finished products. Quality assurance, documentation, and manufacturing execution system processes 320 use the completed design file to document and monitor the manufacturing process 318.

Lines 322 and 324 represent barriers that existed in the prior art, across which no feedback was provided to the designer. As shown in FIG. 3, however, such feedback does occur in the inventive process of the present invention. In particular, feedback from manufacturing process 318 to CAD design 302 is provided, via SMT machine programs 314 and DFx/predictive modeling process 312, by updating the DFx and predictive modeling rules that are applied by DFx/predictive modeling process 312. Similarly, feedback is provided from ERP and supply chain data 310, via company MDSS 308, by updating the procurement data in aggregated database 304. This feedback, as discussed above, reduces the number of design revisions required to take a component from conception to high volume manufacturing, as compared to prior art processes.

Figure 4:
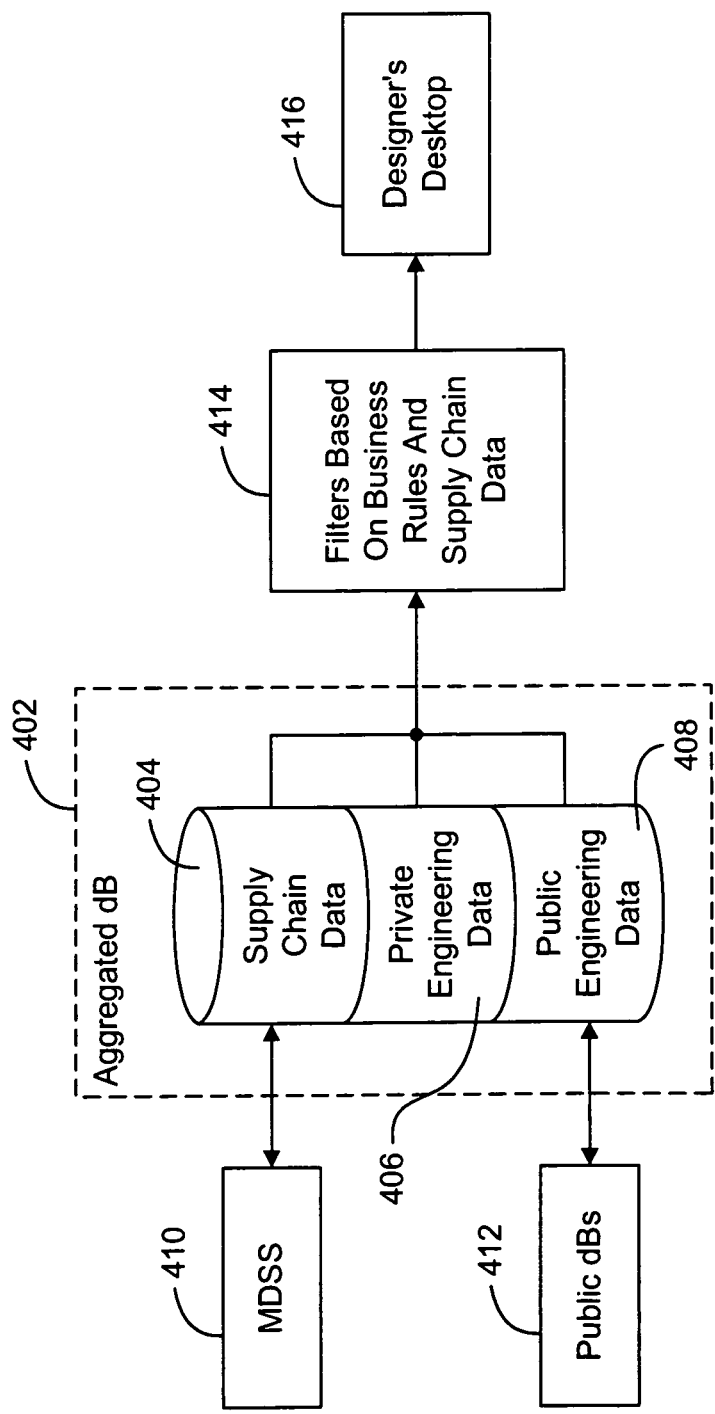
FIG. 4 is a block diagram showing the flow of engineering and procurement data to a designer's desktop.

FIG. 4 is a block diagram illustrating the provision of supply chain (procurement) data and engineering data to the designer's desktop. An aggregated database 402 of electronic devices includes supply chain data 404, private engineering data 406, and public engineering data 408. Supply chain data 404 includes procurement data associated with electronic devices, including but not limited to price, manufacturer, manufacturer preferred status, device availability, delivery terms, AML frequency, and demand. The majority of supply chain data 404 is developed internally and depends on the business relations of the company. However, some supply chain data (e.g., standard price lists, etc.) may be available from public sources. In the present embodiment of the invention, supply chain data 404 is provided to aggregated database 402 from the company MDSS 410. Private engineering data 406 includes but is not limited to the area, footprint, pinouts, parametric data, component geometries, etc., associated with the devices. Public engineering data 408 includes data similar to private engineering data 406, except that public engineering data 408 is provided by one or more public databases 412.

A set of filters 414 based on business rules and supply chain data filters and sorts data presented to a designer's desktop 416. For example, a designer requests parts from database 402 by providing the desired parametric data (e.g., a 100K resistor). The returned devices (all of the 100K resistors) are then sorted and presented to designer's desktop 416 based on the procurement data associated with the devices. For example, less expensive devices would be ranked higher than more expensive devices. As another example, devices from preferred manufacturers would be ranked higher than devices from manufacturers without preferred status. As yet another example, devices that are readily available would be ranked higher than devices that are back ordered. The foregoing examples are provided by way of example only. The particular filtering scheme used will typically depend on the designer's preference. In some cases, the various procurement data values can be assigned a hierarchical sort priority. In other cases, selected procurement data values will be combined in a weighted average. Regardless of how the devices are ranked, the designer will be presented with devices that exist in the company's supply chain, thereby reducing the occurrence of procurement motivated design changes in the future.

Figure 5:
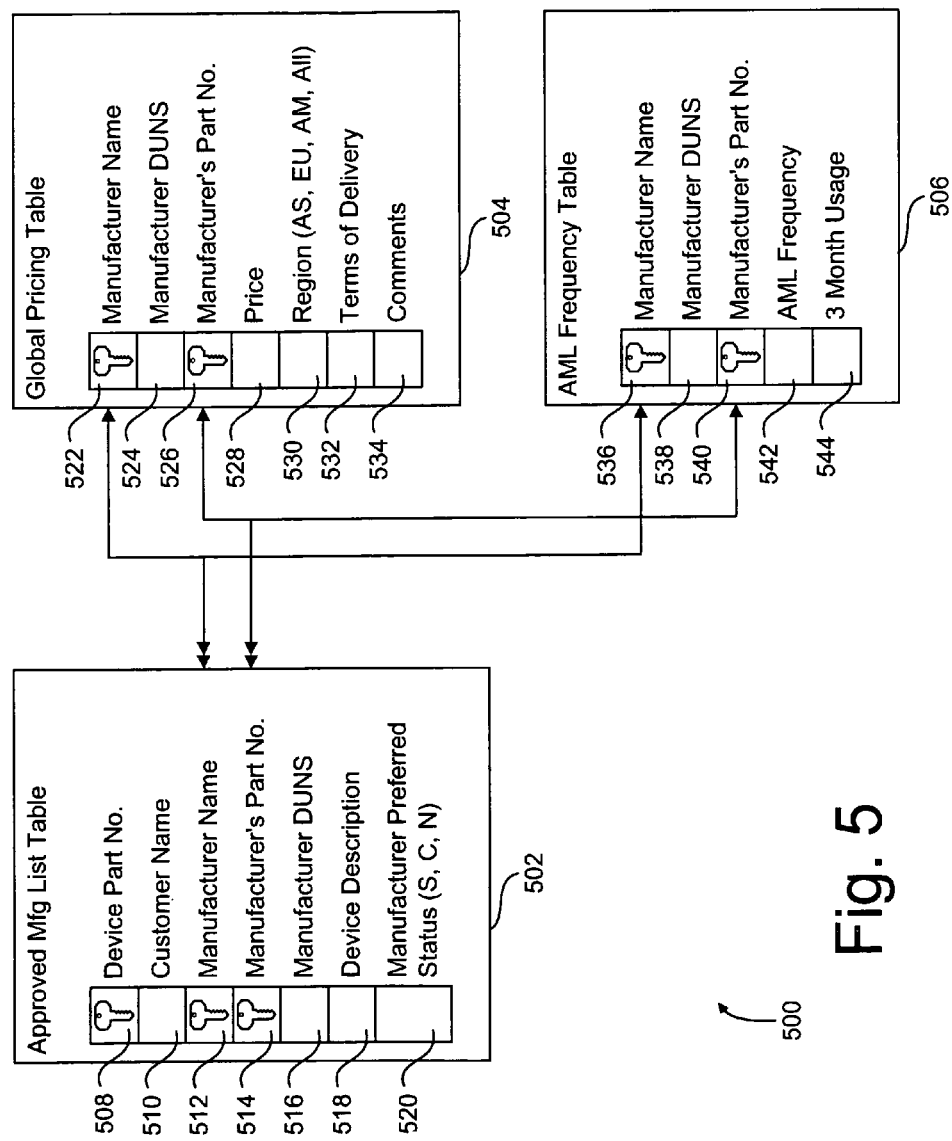
FIG. 5 is a diagram showing an example data structure for the supply chain data shown in FIG. 4.

FIG. 5 shows an example data structure 500 for procurement data provided from MDSS 410 to aggregated database 402. Data structure 500 includes an approved manufacturers list (AML) table 502, a global pricing table 504, and an AML frequency table 506. The records of approved manufacturers table 502 include a internal device part number field 508, a customer name field 510, a manufacturer name field 512, a manufacturer's part number field 514, a manufacturer DUNS field 516, a device description field 518, and a manufacturer preferred status field 520. Device part number field 508 holds a number that identifies a device used for a particular customer in a particular design. Customer name field 510 holds data indicative of the customer for whom a component is being designed. Manufacturer name field 512 holds data indicative of the name of the manufacturer (or supplier) of the device. Manufacturer part number field holds data indicative of a unique part number assigned to the device by the manufacturer. Manufacturer DUNS field 516 holds data that is a standardized representation of the identity of the manufacturer. Device description field 518 holds data that provides a brief description of the device. Manufacturer preferred status field 520 hold data indicative of a preferred status of the manufacturer. For example, some vendors are considered strategic partners (S), other vendors are considered core (C) vendors, and yet others have nonpreferred (N) status. Of course, more or fewer manufacturer preference indicators may be employed, depending on the needs, business relationships, etc. of the company.

Device part number field 508, manufacturer name field 512, and manufacturer's part number field 514 are the key fields of table 502. Together, the manufacturer's name 512 and part number 514 uniquely identify a particular device from a particular manufacturer, and when combined with device part number 508 uniquely identify each record in table 502.

The records of global pricing table 504 include a manufacturer name field 522, a manufacturer DUNS field 524, a manufacturer's part number field 526, a price field 528, a region field 530, a terms of delivery field 532, and a comments field 534. Manufacturer name field 522 and manufacturer's part number field 526 are the key fields of table 504, and together define a particular physical device from a particular manufacturer. Manufacturer DUNS field 526 holds the same data as field 516 of table 502. Price field 528 holds data indicative of the unit price of the device. Prices from vendors around the world should be converted to one common currency, so that prices can be compared. Region field 530 holds data indicative of the geographical region of the manufacturer (e.g., Europe, Asia, North America, etc.). Terms of delivery field 532 holds data indicative of the delivery terms (lead time, delivery method, etc.) in place with the manufacturer.

Comments field 534 is a free text field for storing any comments which may be relevant to device selection, or helpful to procurement staff.

The records of AML frequency table 506 include a manufacturer name field 536, a manufacturer DUNS field 538, a manufacturer's part number field 540, an AML frequency field 542, and a 3-month usage field 544. Manufacturers name field 536 and manufacturer's part number field 540 are the key fields in table 506, and relate to fields 512 and 514 in table 502, and to fields 522 and 526 in table 504, respectively, as shown by the relational arrows in FIG. 5. The dual arrowheads on the relational arrows indicate that more than one record in table 502 can include a given combination of a manufacturer name and part number. Manufacturer DUNS 538 holds data similar the identically named fields in the other tables.

AML frequency field 542 holds data indicative of the number of records in table 502 that have the same values in their manufacturer name fields 512, 536 and their manufacturer part number fields 514, 540. In other words, how many customers and or projects has this particular device from this particular manufacture been approved for. 3-Month usage field 544 holds data indicative of the number of this particular device that has been used during the preceding 3 months.

Figure 6:
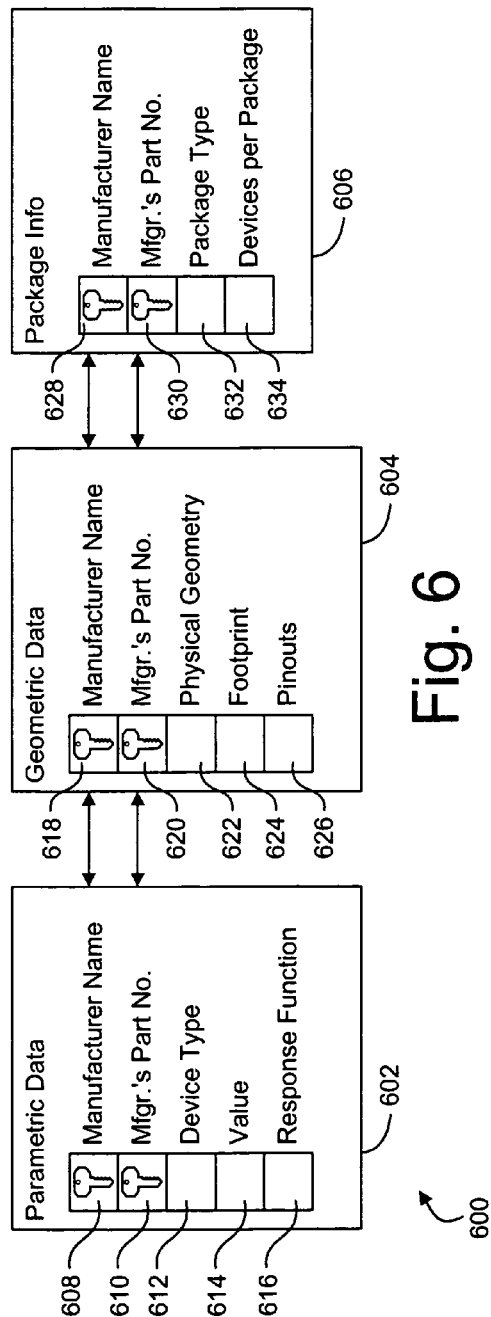
FIG. 6 is a diagram showing an example data structure for the private engineering data shown in FIG. 4.

FIG. 6 shows an example data structure 600 for storing private engineering data 406. Data structure 600 includes a parametric data table 602, a geometric data table 604, and a package information table 606. The records of parametric data table 602 includes a manufacture name field 608, a manufacturer's part number field 610, a device type field 612, a value field 614, and a response function field 616. Manufacture name field 608 and manufacturer's part number field 610 are the key fields, and relate to the identically named fields in data structure 500 (FIG. 5). Indeed, this relationship provides a link between private engineering data 406, supply chain data 404, and public engineering data 408 (described below) of aggregated database 402. Device type field 612 holds data indicative of the kind of device (resistor, transistor, logic gate, etc.) represented by the record. Value field 614 holds data indicative of the value (100 ohms, AND gate, etc.) of the device. Response function field 616 holds data (e.g., a mathematical function) capable of replicating the electronic characteristics of the device.

Figure 7:
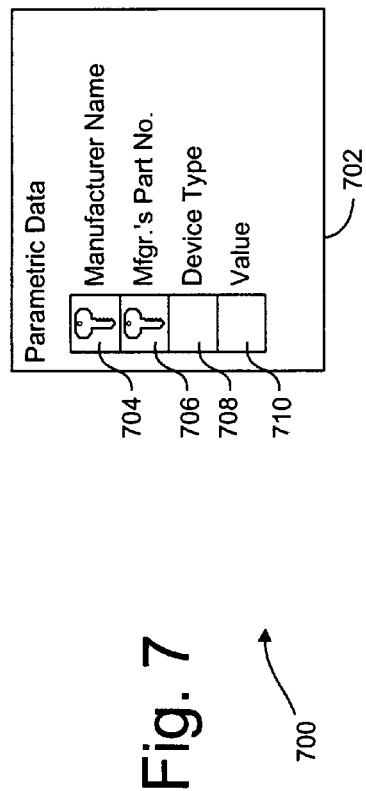
FIG. 7 is a diagram showing an example data structure for the public engineering data shown in FIG. 4.

The records of geometric data table 604 include a manufacturer name field 618, a manufacturer's part number field 620, a physical geometry field 622, a footprint field 624, and a pinouts field 626. Manufacturer name field 618 and manufacturer's part number field 620 are the key fields of table 604 and relate to the fields of the same name in tables 602 and 606 as shown, and to the same fields of the same name in data structures 500 (FIG. 5) and 700 (FIG. 7). Physical geometry field 622 holds data indicative of the physical dimensions (size, shape, etc.) of the device. Footprint field 624 holds data indicative of the footprint (shape and area) the device will occupy on the PCB. Pinouts field 626 includes data indicative of the pin (electronic connections) configuration of the device.

The records of package information table 606 include a manufacturer name field 628, a manufacturer's part number field 630, a package type field 632, and a devices per package field 634. Manufacturer name field 628 and manufacturer's part number field 630 are the key fields of table 606. Package type field 632 holds data indicative of what type of package (individual, DIP, etc.) the device comes in. Devices per package field 634 holds data indicative of the number of devices that come in the particular package type. For example, multiple logic gates typically are available in one dual-inline package (DIP).

FIG. 7 shows an example data structure 700 for public engineering data 408 to include a parametric data table 702. The records of parametric data table 702 include a manufacturer name field 704, a manufacturer's part number field 706, a device type field 708, and a value field 710. Manufacturer name field 704 and manufacturer's part number field 706 are the key fields of table 702. Device type field 708 holds data indicative of the kind of device, and value field 710 holds data indicative of the electronic value of the device.

Although data structure 700 has fewer different fields than data structure 600, in this particular embodiment table 702 will have far more records than the tables of data structure 600. Indeed, it is desirable that table 700 provide as complete a library of all available parts from all manufacturers as possible. Then, a designer will be able to find devices meeting his/her requirements, even if there is no corresponding part in private engineering database 406.

There is no specific requirement that any particular type of data be held in private engineering data 406 instead of public engineering data 408. Rather, the decision of where to store the data depends more on the value of the data. Data that is sensitive, that is not freely available to the public, that requires a significant investment of time an resources to accumulate, and/or that provides a competitive advantage would typically be kept private.

The above-described data structures are provided by way of example, in order to provide a clear explanation of the invention. Known DFx and predictive modeling programs analyze a wide variety of characteristics of component designs. In view of this disclosure, it should be clear to one skilled in the art that many additional data fields can be added to the data structures shown herein, depending on the type and requirements of the analytical programs utilized. The data structures shown herein are kept relatively simple to avoid obscuring the invention with database programming issues that are well known to those skilled in the art.

Figure 8:
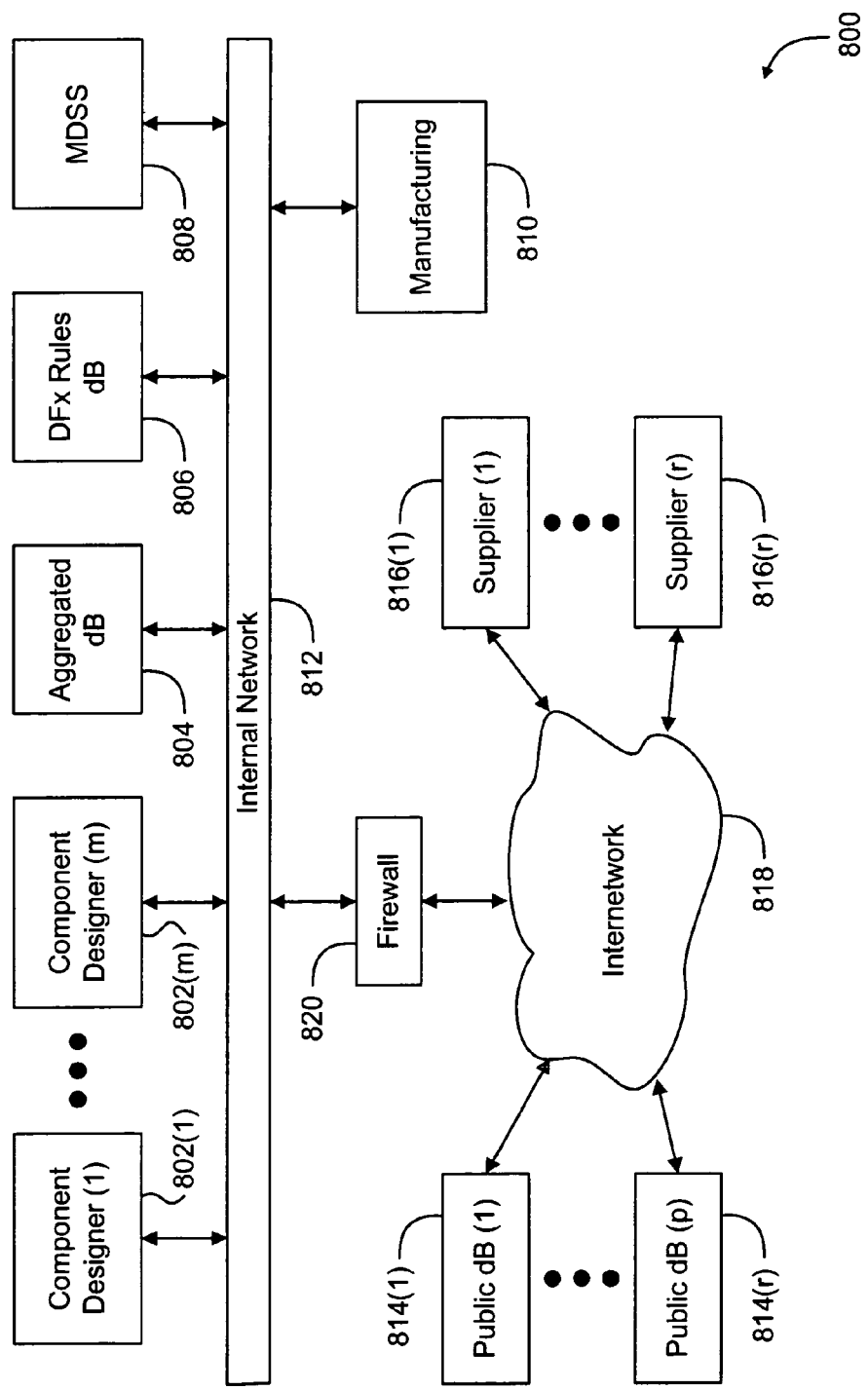
FIG. 8 is a block diagram showing a system for designing an electronic component according to one embodiment of the present invention.

FIG. 8 is a block diagram of a system 800 for designing electronic components according to one embodiment of the present invention. System 800 includes a plurality of component design stations 802(1-m), an aggregated database 804, a DFx rules database 806, an MDSS 808, and a manufacturing process 810, all intercommunicating through an internal network 812. Component design stations 802(1-m) include a schematic design tool with integrated DFx and procurement based decision-making capabilities, as will be described in greater detail. Aggregated database 804 is similar to aggregated database 402 described with reference to FIGS. 4-7. DFx rules database 806 is a compilation of rules that are applied when component design stations 802 perform DFx analysis or predictive modeling on design files. MDSS provides procurement data to aggregated database 804 that is used by component design systems 802 when selecting devices for placement in design files. Manufacturing process 810 is representative of facilities that manufacture the components designed by design stations 802.

DFx rules database 806 provides a feedback mechanism from manufacturing process 810 to design stations 802. In particular, manufacturing process 810 updates DFx rules database 806. Assume, for example, that a particular design has a manufacturing design flaw that is not recognized by the DFx analysis performed by design stations 802. When the design flaw is discovered in manufacturing process 810, manufacturing process 810 will update the DFx rules to recognize that particular problem. Thus, the defect will not be repeated in subsequent designs, or in subsequent revisions of the same design. In contrast, according to the prior art, the manufacturing process would simply revise the design to remedy the defect. Then, the defect would be repeated in subsequent designs and/or subsequent revisions of the same design.

Aggregated database 804 can also be augmented and/or updated from a plurality of public databases 814(1-p) and/or the company's suppliers 816(1-r) via an internetwork 818 (e.g., the Internet). A firewall 820 protects private data in aggregated database 804 from unauthorized access.

Figure 9:
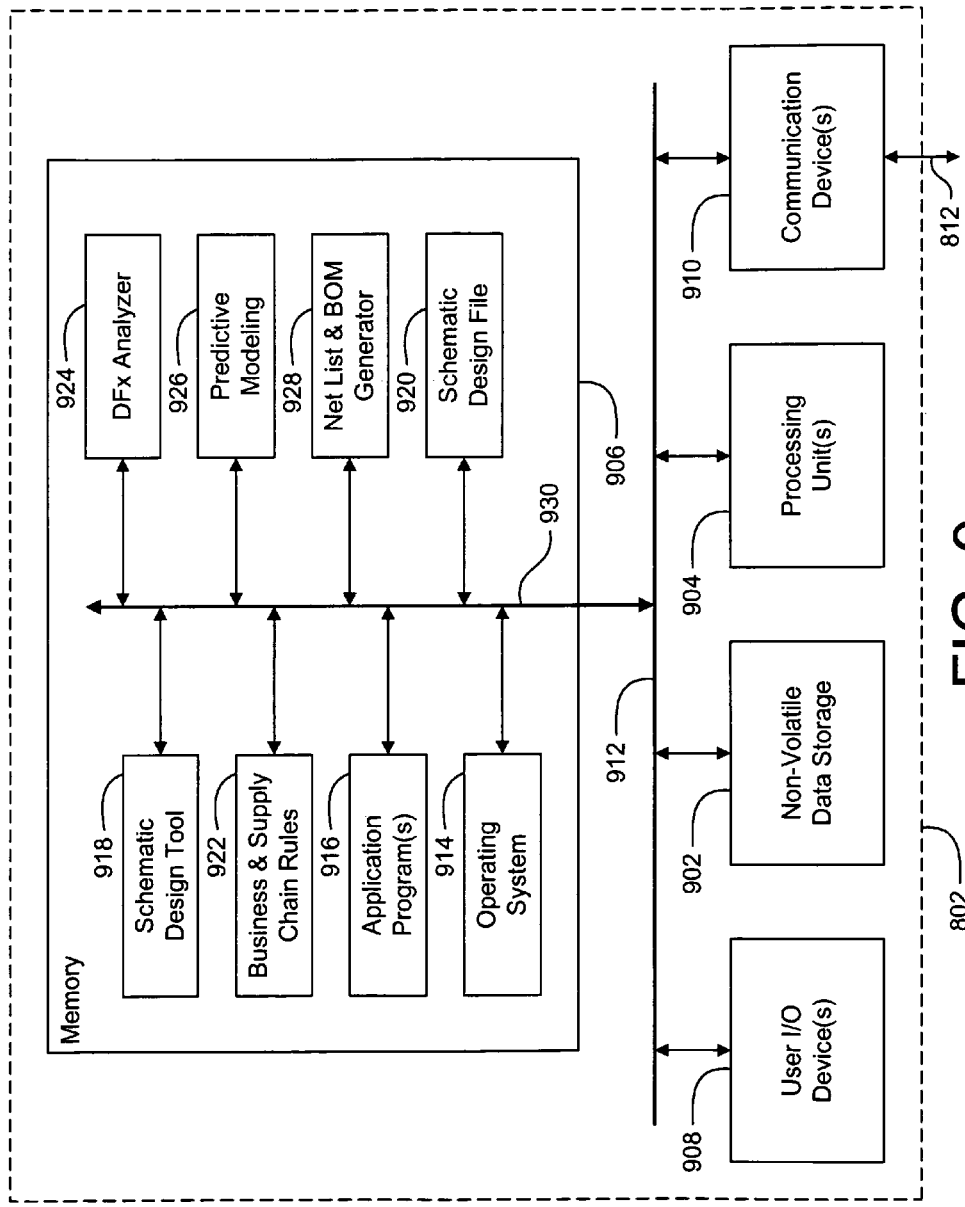
FIG. 9 is a block diagram showing a designer system of FIG. 8 in greater detail.

FIG. 9 is a block diagram showing one of design stations 802 in greater detail to include non-volatile data storage 902, one or more processing units 904, working memory 906 (e.g., random access memory), user input/output (I/O) devices 908, and one or more communication devices 910, all intercommunicating via an internal bus 912. Nonvolatile data storage 902 stores data and code that is retained even when design station 802 is powered down. Typical examples of non-volatile data storage include read only memory (ROM), hard disk drives, optical disk drives, and other types of removable media. Processing unit(s) 904 impart functionality to design station 802 by processing the executable code stored in non-volatile data storage 902 and memory 906. Working memory 906 provides temporary storage for data and code being processed by processing unit(s) 904. User I/O devices 908 provide a means for the designer to interact with design station 802, and typically include such devices as a keyboard, a monitor, a printer, a pointing device, and the like. Communication device(s) include devices such as a modem, and a network adapter that facilitates communication with the other devices on network 812.

In order to clearly explain the operation of design station 802, the functionality of design station 802 is shown representationally as code blocks in memory 906. Those skilled in the art will understand, however, that all of the code need not remain in memory 906 during the operation of design station 802. Indeed, processing unit(s) 904 will typically shuffle portions of the code into and out of memory 906 (e.g. to/from non-volatile data storage 902, databases 804, 806, etc.), for execution as required during operation. Further, although the functional blocks in memory 906 are shown to be physically coupled, those skilled in the art will understand that they are actually processes that communicate by calling one another for execution.

As shown in FIG. 9, memory 906 includes an operating system 914, one or more application programs 916, a schematic design tool 918, a schematic design file 920, a set of business and supply chain rules 922, a DFx analyzer 924, a predictive modeling process 926, and a net list and BOM generator 928. Operating system 914 is a low level program upon which the other programs run. Application programs 916 is representative of word processing programs, graphics programs, and the like, and is intended to show that design station 802 need not be dedicated solely to schematic design tool 918.

Schematic design tool 918, responsive to receiving data and commands from a designer, is operative to create schematic design file 920, by adding electronic devices to design file 920 as follows. The designer initiates the process of adding a device to design file 920 by providing a parametric value for the desired device. For example, the designer can input the type and value of a device, such as a 100-ohm resistor. Schematic design tool 918 then queries aggregated database 804 for devices satisfying the parametric requirements. Database 804 returns records for all devices found to meet the search parameters, including engineering and procurement data associated with the devices. Before presenting the returned devices to the designer for selection, however, schematic design tool 918 sorts and filters the data by applying business and supply chain rules 922 to the procurement data associated with the returned device records. For example, design tool 918 might filter out all devices that are not manufactured by a preferred vendor. As another example, design tool 918 might filter the returned devices based on price or availability. Additionally, design tool 918 invokes DFx analyzer to filter the returned device records by applying the DFx rules to the engineering data associated with the returned devices, thereby removing any devices whose addition to design file 920 would violate DFx rules (e.g., incompatible device types).

Figure 10:
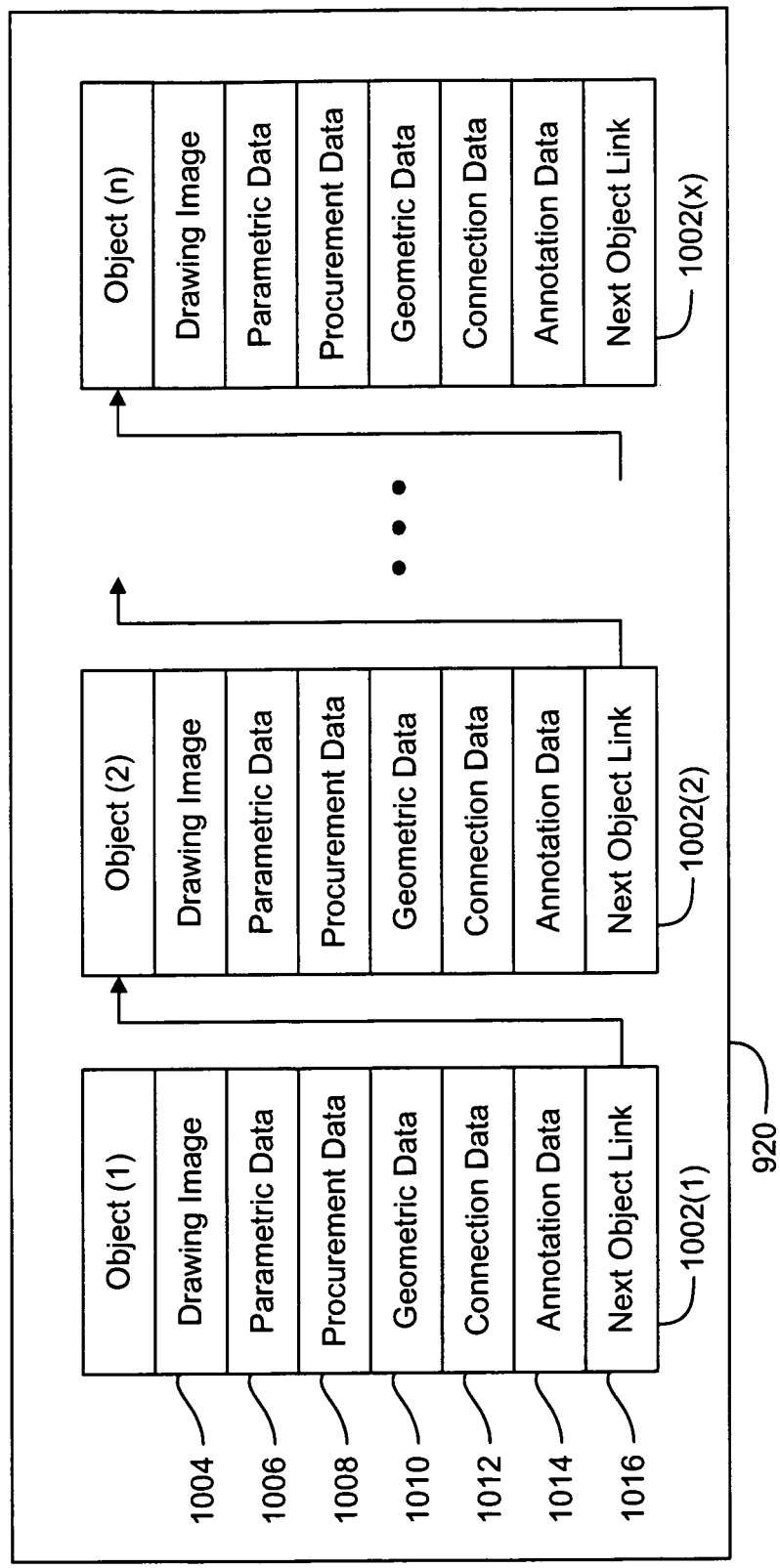
FIG. 10 is a diagram showing an example data structure for the schematic design file of FIG. 9.

The explanation of the operation of design tool 918 will proceed with additional reference to FIG. 10, which shows an example data structure for design file 920. Design file 920 includes a linked list of objects 1002(1-x). Each of objects 1002 represents a device in design file 920, and includes drawing image data 1004, parametric data 1006, procurement data 1008, geometric data 1010, connection data 1012, annotation data 1014, and a link to the next object 1002 in the list. Drawing image data 1004 is used to generate an image of a symbol representing the device on a display screen, printout, or the like. The content of parametric data 1006, procurement data 1108, and geometric data 1010 is described above. Connection data 1012 indicates the electronic connections (e.g., pin to pin) to other objects in design file 920. Annotation data 1014 stores annotations (e.g., revisions, etc.) to design file 920, and next object link 1016 provides the address of the next object in the linked list.

Referring again to FIG. 9, once the returned devices are sorted and filtered, design tool 918 presents the sorted devices to the designer for selection. The designer then inputs his selection via I/O devices 908, identifying one of the presented devices as the selected device. Next, design tool 918 adds an object 1002 representative of the selected device into design file 920, and associates the procurement and engineering data records with the newly added object by writing the device's procurement data to field 1008, and writing the device's engineering data to parametric data field 1006 and geometric data field 1010. Optionally, links to the procurement and engineering data can be written to object 1002, instead of the data itself.

Once an object 1002 is added to design file 920, the designer can established electronic connections with other objects in design file 920. Responsive to input from the designer (e.g., drawing a connecting line with a pointing device), schematic design tool 918 enters data in the connection data fields 1012 of the objects being linked. The connection data indicates which pins/terminals are connected. DFx analyzer 924 checks to ensure that the connections do not violate any of the DFx rules.

The designer continues placing and connecting devices in design file 920, until the design is complete. When design file 920 is complete, the procurement and engineering data associated with the objects 1002 in design file 920 enable the use of a variety of design analyzers and tools that will expedite the manufacturing process. For example, DFx analyzer 924 can now be invoked again to analyze design file 920. The test run by DFx analyzer 924 include, but are not limited to, design for manufacturability, design for testability, design for fabrication, design for procurement, design for reliability, and design for quality. Additionally, predictive modeling process 926 can analyze the operation of the designed circuit, using the parametric data and connection data associated with the objects 1002 in design file 920.

Further, tools such as Net list and BOM generator 928 can operate on design file 920 to generate reports or files that help expedite subsequent stages of the manufacturing process. Net list and BOM generator 928 automatically generate a net list and a BOM from the engineering and procurement data associated with the objects 1002 in design file 920. In the prior art, such reports were compiled manually from a schematic drawing, which contained only symbols of devices. The processes were time intensive and prone to errors. The automatic generation of such reports according to the present invention provides a significant savings of time and a significant reduction in errors as compared to the manual methods of the prior art.

All that is required to enable a particular tool or analyzer is that the data required for a particular analysis or tool be embedded in (or linked to) the objects 1002 placed in the design file 920 during the design stage. Indeed, it is expected that, in view of this disclosure, additional analyses and tools will be developed, and the data required for such analyses will be provided to aggregated database 804, and associated with the devices stored therein.

Figure 11:
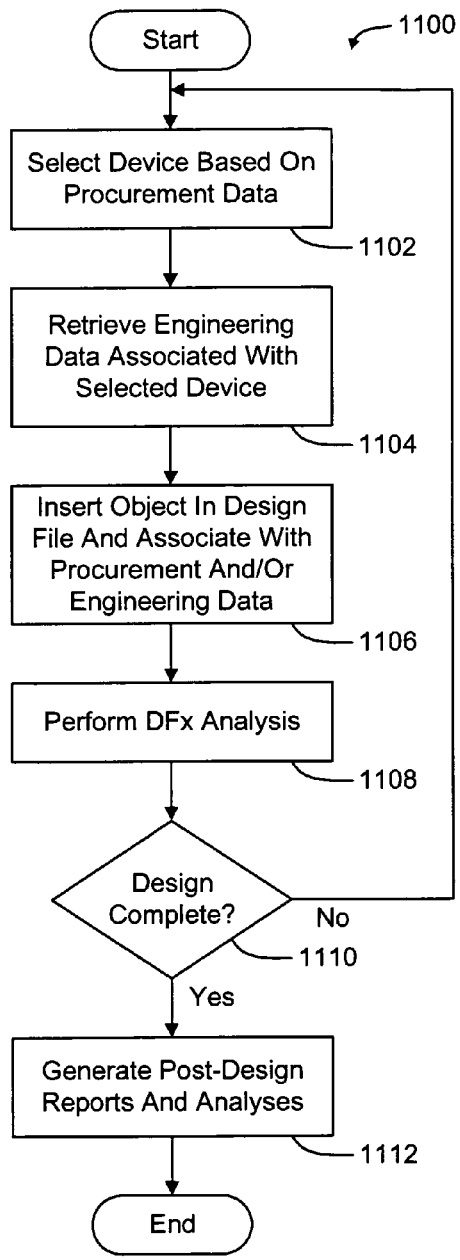
FIG. 11 is a flow chart summarizing one particular method for designing an electronic component according to the present invention.

FIG. 11 is a flow chart summarizing one particular method 1100 for designing an electronic component according to one aspect of the present invention. In a first step 1102, the designer selects a device for addition to a design file based on procurement data associated with the device. Then, in a second step 1104, engineering data associated with the selected device is retrieved. Next, in a third step 1106, an object is inserted in the design file, and the object is associated with the procurement and/or engineering data. In a fourth step 1108, DFx analysis is performed to ensure that the addition of the device to the design file does not violate any design rules. Then, in a fifth step 1110, the designer determines whether the design is complete. If not, then method 1100 returns to first step 1102 to select another device for addition to the design file. If the design is complete, then method 1100 proceeds to a sixth step 1112, where post design analyses are performed, and post design reports are generated. Then, the design method 1100 ends.

Figure 12:
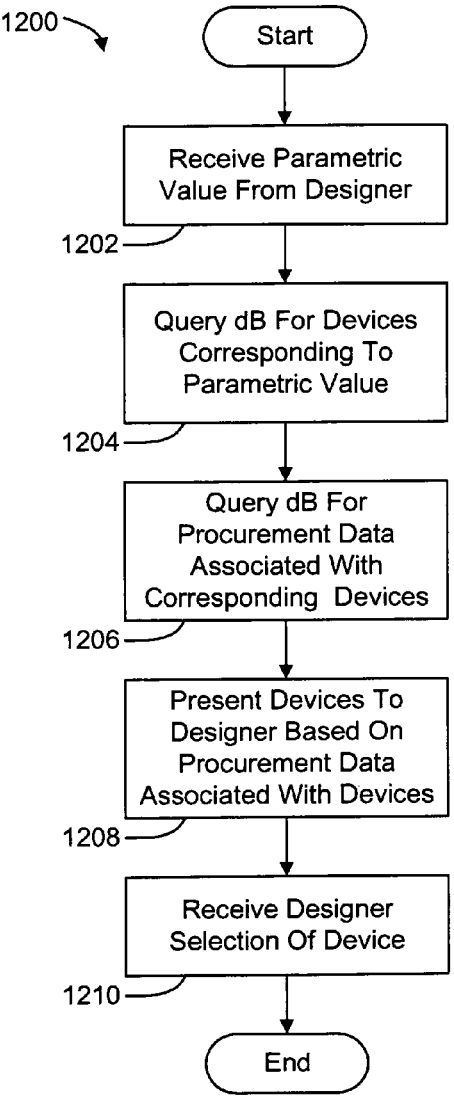
FIG. 12 is a flow chart summarizing one particular method for selecting a device for use in a design based on procurement data associated with the device.

FIG. 12 is a flow chart 1200 summarizing one particular method for performing first step 1102 of method 1100 for selecting a device based on procurement data. In a first step 1202, the system receives a search criteria (e.g., a parametric value) from the designer. Then, in a second step 1204, a database is queried for devices corresponding to the search criteria. Next, in a third step 1206, the database is queried for procurement data associated with the returned devices. Note that the database queries of steps 1104, 1204, and 1206 can, and most likely would, be performed simultaneously as a single query. Next, in a fourth step 1208, the devices returned in response to the queries are filtered and/or sorted based on the procurement and/or design data associated with the returned devices and presented to the designer. Then, in a fifth step 1210, the designer's selection of one of the presented devices is received by the system, and device selection method 1200 ends.

The description of particular embodiments of the present invention is now complete. Many of the described features may be substituted, altered or omitted without departing from the scope of the invention. For example, alternate data structures may be substituted for the data structures. As another example, additional and/or different engineering and/or procurement data can be included in the objects of the design file. Further, additional and/or different analyses and reports can be generated from the different/additional data. These and other deviations from the particular embodiments shown will be apparent to those skilled in the art, particularly in view of the foregoing disclosure. Indeed, the examples presented herein are intended to be relatively simple, so as not to obscure the invention with details well know to software and database programmers.

Further, those skilled in the art will recognize that the present invention includes several novel aspects, which are considered to be inventive both individually and in combination with one another. Therefore, no single aspect of the present invention should be considered an essential element of the present invention. Indeed, it is anticipated that in various particular embodiments one or more inventive features of the invention may be omitted, while retaining other inventive features.

We claim:

1. An electronically-readable storage medium having stored therein a data structure comprising: a first field containing data representing an electronic device; a second field containing engineering data associated with said electronic device; a third field containing procurement data associated with said electronic device; and a fourth field containing data representing electrical connections to another electronic device,
   wherein one or more of the procurement data associated with said electronic device and the engineering data associated with the electronic device enables a DFx analyzer to determine whether the addition of the electronic device to a design file complies with a set of predetermined DFx rules.

2. An electronically-readable storage medium according to claim 1, wherein said data structure further comprises a field containing data representing a graphical image of said electronic device.

3. An electronically-readable storage medium according to claim 1, wherein said engineering data includes parametric data.

4. An electronically-readable storage medium according to claim 1, wherein said engineering data includes geometric data.

5. An electronically-readable storage medium according to claim 4, wherein said geometric data includes data representing a device footprint.

6. An electronically-readable storage medium according to claim 4, wherein said geometric data includes data representing a device pinout arrangement.

7. An electronically-readable storage medium according to claim 1, wherein said engineering data includes geometric data; and further comprising a field containing parametric data associated with said electronic device.

8. An electronically-readable storage medium according to claim 1, wherein said procurement data represents a manufacturer associated with said electronic device.

9. An electronically-readable storage medium according to claim 8, further including a field containing data representing a preferred status associated with said manufacturer.

10. An electronically-readable storage medium according to claim 8, further including a field containing data representing a price associated with said electronic device.

11. An electronically-readable storage medium according to claim 8, further including a field containing data representing an availability of said electronic device.

12. An electronically-readable storage medium according to claim 1, wherein said DFx analyzer performs at least one of a design for manufacturability analysis, a design for testability analysis, a design for fabrication analysis, design for procurement analysis, a design for reliability analysis, and a design for quality analysis to determine whether the addition of the electronic device to a design file complies with the set of predetermined DFx rules.

13. A memory for storing data for access by an application program being executed on a data processing system, comprising: a data structure stored in said memory, said data structure including information comprising: a first field containing data representing an electronic device; a second field containing engineering data associated with said electronic device; a third field containing procurement data associated with said electronic device; and a fourth field containing data representing electrical connections to another device, wherein one or more of the procurement data associated with said electronic device and the engineering data associated with the electronic device enables a DFx analyzer to determine whether the addition of the electronic device to a design file complies with a set of predetermined DFx rules.

14. A memory for storing data for access by an application program according to claim 13, wherein said engineering data includes parametric data.

15. A memory for storing data for access by an application program according to claim 13, wherein said engineering data includes geometric data.

16. A memory for storing data for access by an application program according to claim 15, wherein said geometric data includes data representing a device footprint.

17. A memory for storing data for access by an application program according to claim 15, wherein said geometric data includes data representing a device pinout arrangement.

18. A memory for storing data for access by an application program according to claim 13, wherein said engineering data includes geometric data; and further comprising a field containing parametric data associated with said electronic device.

19. A memory for storing data for access by an application program according to claim 13, wherein said procurement data represents a manufacturer associated with said electronic device.

20. A memory for storing data for access by an application program according to claim 19, further including a field containing data representing a preferred status associated with said manufacturer.

21. A memory for storing data for access by an application program according to claim 19, further including a field containing data representing a price associated with said electronic device.

22. A memory for storing data for access by an application program according to claim 19, further including a field containing data representing an availability of said electronic device.

23. A memory for storing data for access by an application program according to claim 13, wherein said data structure further comprises a field containing data representing a graphical image of said electronic device.

24. A memory for storing data for access by an application program according to claim 13, wherein said DFx analyzer performs at least one of a design for manufacturability analysis, a design for testability analysis, a design for fabrication analysis, design for procurement analysis, a design for reliability analysis, and a design for quality analysis to determine whether the addition of the electronic device to a design file complies with the set of predetermined DFx rules.

* * * * *